United States Patent
von Praun et al.

(10) Patent No.: US 7,356,653 B2
(45) Date of Patent: Apr. 8, 2008

(54) READER-INITIATED SHARED MEMORY SYNCHRONIZATION

(75) Inventors: Christoph von Praun, Munich (DE); Jong-Deok Choi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/144,862

(22) Filed: Jun. 3, 2005

(65) Prior Publication Data

US 2006/0277374 A1 Dec. 7, 2006

(51) Int. Cl.
*G06F 12/14* (2006.01)

(52) U.S. Cl. .................... 711/147; 711/150
(58) Field of Classification Search ............. None
See application file for complete search history.

(56) References Cited

U.S. PATENT DOCUMENTS

| | | | | |
|---|---|---|---|---|
| 5,142,676 | A * | 8/1992 | Fried et al. ............... | 711/152 |
| 6,314,563 | B1 * | 11/2001 | Agesen et al. ............ | 717/108 |
| 6,370,625 | B1 * | 4/2002 | Carmean et al. ......... | 711/152 |
| 6,446,149 | B1 * | 9/2002 | Moriarty et al. ......... | 710/110 |
| 7,080,228 | B2 * | 7/2006 | Huras et al. ............. | 711/170 |
| 7,149,853 | B2 * | 12/2006 | Krueger .................. | 711/150 |
| 7,174,434 | B2 * | 2/2007 | Blumrich et al. ........ | 711/152 |
| 7,213,248 | B2 * | 5/2007 | Arimilli et al. ......... | 718/104 |
| 7,228,391 | B2 * | 6/2007 | Silvera et al. ........... | 711/152 |
| 2001/0014905 | A1 * | 8/2001 | Onodera .................. | 709/102 |
| 2004/0073734 | A1 * | 4/2004 | Arimilli et al. ......... | 710/200 |
| 2004/0073756 | A1 * | 4/2004 | Arimilli et al. ......... | 711/146 |
| 2004/0073757 | A1 * | 4/2004 | Arimilli et al. ......... | 711/147 |
| 2004/0073759 | A1 * | 4/2004 | Arimilli et al. ......... | 711/163 |
| 2004/0073760 | A1 * | 4/2004 | Arimilli et al. ......... | 711/163 |
| 2004/0073766 | A1 * | 4/2004 | Arimilli et al. ......... | 711/202 |
| 2004/0073909 | A1 * | 4/2004 | Arimilli et al. ......... | 718/105 |
| 2005/0149945 | A1 * | 7/2005 | Stichnoth ................. | 719/316 |
| 2005/0289549 | A1 * | 12/2005 | Cierniak et al. ......... | 718/102 |

OTHER PUBLICATIONS

Bill Hay and Gary Hook, "POWER4 and Shared Memory Synchronisation," http://www-128.ibm.com/developerworks/eserver/articles/power4_mem.html, Apr. 24, 2002.*

* cited by examiner

*Primary Examiner*—Kevin Verbrugge
(74) *Attorney, Agent, or Firm*—Michael J. Buchenhorner; Douglas W. Cameron

(57) ABSTRACT

A method of optimizing memory synchronization through software in a multi-threaded computer system using a read-initiated memory synchronization process is described. One or more embodiments of the invention may operate in a computer system capable of executing at least one computational activity needing exclusive access shared memory. In the method of one or more embodiments, a multi-field lock may be associated with shared memory to reserved it for exclusive use by a first processor, and where the multi-field lock is already reserved by a second processor, synchronizing the shared memory by the second processor, updating the multi-field lock reservation information; and performing instruction synchronization for the first processor.

8 Claims, 6 Drawing Sheets acquire 500

```
while (true){                                      520
    tmp = lwarx(lock);
    if (!(tmp.flag)&& stwcx(<tid>, &lock.flag))
        break;
}
```
Flow synchronization

```
if (tmp.res != <pid>) {
    rsync(tmp.res);
    lock.res = <pid>;                              530
    isync;
}
```
Memory synchronization `<critical region>`        530 release 540

```
if (<pid> != tmp.res) {
    // thread migration                            550
    lock.res = <pid>;
    svnc:
```
Flow synchronization

```
}
lock.flag = 0;                                     560
```
Memory synchronization

FIGURE 5

```
acquire                                                    600
   while (true){                              610
       tmp = lwarx(lock);
       if (!(tmp & 1) && stwcx(<tid> | 1, &lock))
          break;
   } if (tmp != <tid>) {                        620
   rsync(tmp);
       isync;
   }
```

```
<critical region>          630
```

```
Release                                                    640
   lock.flag = <tid>;
```

FIGURE 6

READER-INITIATED SHARED MEMORY SYNCHRONIZATION

FIELD OF THE INVENTION

This invention broadly relates to the field of synchronization of processing in multiprocessor systems, and more particularly relates to streamlining synchronization protocols in execution of multi-threaded server applications.

BACKGROUND

Serial computers present a simple and intuitive model to the programmer. A load operation returns the last value written to a given memory location. Likewise, a store operation binds the value that will be returned by subsequent loads until the next store to the same location. This simple model lends itself to efficient implementations. The accesses may even be issued and completed out of order as long as the hardware and compiler ensure that data and control dependences are respected.

For multiprocessors, however, neither the memory system model nor the implementation is as straightforward. The memory system model is more complex because the definitions of "last value written," "subsequent loads," and "next store" become unclear when there are multiple processors reading from and writing to a memory location. Furthermore, the order in which shared memory operations are done by one process may be used by other processes to achieve implicit synchronization. Consistency models place specific requirements on the order that shared memory accesses (events) from one process may be observed by other processes in the machines. More generally, the consistency model specifies what event orderings are legal when several processes are accessing a common set of locations.

Modern multiprocessor systems provide a weakly consistent view of memory to the individual processors. This means that different computations on different processors may observe the shared memory in different states at the same time. The weak memory consistency is due to mechanisms inside the individual processors that serve to optimize the memory access path (caches) and aggressively reorder memory accesses.

Weakly consistent multi-processor machines provide mechanisms to explicitly and temporarily establish a consistent memory view. These mechanisms are available to the programmer through various synchronization constructs. Synchronization in multi-threaded shared memory multiprocessors generally fulfill two purposes:

(1) Flow synchronization coordinates the control-flow (progress) in the threads that synchronize. Flow synchronization achieves that certain races (i.e., races for locks) among the synchronizing threads are resolved unambiguously.

(2) Memory synchronization establishes a consistent view of shared memory across all threads that participate in the synchronization.

Methods for inter-thread synchronization are available at the programming level in the form of locks, monitors, barriers, etc. These constructs combine both of the above two aspects of synchronization. First, the control flows of synchronizing threads meet at some synchronization point (1: flow synchronization). Second, an acquire operation is necessary to correctly observe the most recent value of shared variables after a synchronization point (2: memory synchronization). Finally, updates to shared memory are guaranteed to be visible to other threads only after a release operation. A release operation is typically issued before a synchronization point (2: memory synchronization).

Typical application-level synchronization constructs (locks, monitors, barriers, etc.) follow an acquire-release synchronization protocol, where flow synchronization is always accompanied by the corresponding memory synchronization. An example can be seen in FIG. 1, which illustrates an example of a typical acquire-release synchronization protocol demonstrating proactive memory synchronization that utilizes instruction sets supported by the PowerPC™ family of processors.

Referring to FIG. 1, in order to perform a critical region of code, for example to alter the content of shared memory, a program must acquire exclusive access to that memory. Exclusive access is obtained by acquiring a lock on the memory, as would be understood by one of ordinary skill in the art. First, an acquire function 100 is performed. Next, critical region 130 may be executed. When critical region 130 has completed, the program may release its exclusive hold on the memory by performing a release function 140. The lwarx and stwcx instructions of the acquire step 110 may be executed in a loop to achieve an atomic 'load and store' of the lock variable. Once a thread succeeds to atomically read a lock value of zero (0) and to store its thread ID <tid> into the lock, it wins the race for the lock. It should be noted that the method illustrated in FIG. 1 provides a simplified example, and does not contain provisions for re-entrant acquire, backoff and queued waiting.

The isync instruction of step 120 ensures that preceding instructions are complete and discards that follow it (in program order) that may have already started execution (e.g., due to pipelining or out-of order execution). In particular, all read memory accesses that precede isync will have performed before read accesses that follow isync.

When critical region 130 is complete, exclusive access to the memory may no longer be required, and can be released using release function 140. At release step 150, the sync instruction is performed. The sync instruction is similar to the isync instruction of step 120, but more comprehensive in scope. In addition to the local sequencing of instructions that preceded and respectively follow it, sync ensures that the underlying memory subsystem performs loads and stores due to instructions that preceded sync, before loads and stores that are due to instruction that follow sync (in program order). Finally, the lock is cleared at step 160.

In a correct instance of the protocol, acquire and release operations occur in matching pairs; a pair matches if the operations acquire 100 and release 140 are associated with the same lock. Release operation 140 is only required to ensure the visibility of updates that occurred since the last acquire. A particular implementation of memory synchronization, such as in the example of FIG. 1, may be more comprehensive. In particular, the PowerPC™ instructions sync, isync, lwsync make the overall memory—instead of only selected parts (those modified since the last acquire)—consistent. This well known implementation is conservative and more comprehensive than what is required, and hence correct by more costly than necessary.

Instructions for performing memory synchronization are relatively more expensive, in terms of machine cycles, than other memory access or arithmetic instructions. Table 1 gives an overview on the cost of different memory synchronization operations on an IBM Power 4, 1.1 GHz processor.

TABLE 1

| sync | 125-150 cycles | lwsync | 100-125 cycles |
|---|---|---|---|
| isync | 30-40 cycles | lwarx/stwcx | 50 cycles |

Lock-Locality

The typically applied strict combination of flow and memory synchronization used when acquiring shared resources in application level programs, as demonstrated in FIG. 1, may therefore lead to superfluous memory synchronization. An example of this approach is illustrated in FIG. 2. In the execution of the example in FIG. 2, logical processor 200 executes an immediate sequence of acquire and release operations on the same lock as logical processor 220. This example illustrates a phenomenon sometimes called lock locality 230. The isyncs issued at the second and third acquire ($isync_{250}$ and $isync_{270}$) are unnecessary in this example, because any read instructions following those isyncs will find that all relevant data is already consistent on logical processor 220 (due to the execution of the prior synchronization, $isync_{230}$). The sync instructions issued on logical processor 220 are issued pro-actively, such that the first and second instances of the instruction ($sync_{240}$ and $sync_{260}$) turn out to be unnecessary in the execution history.

Therefore, a need exists to overcome the problems with the prior art as discussed above, and particularly for a way to streamlining synchronization protocols in execution of multi-threaded server applications.

BRIEF SUMMARY OF THE INVENTION

Briefly, according to embodiment of the invention, a method, information processing system, and computer readable medium for a novel inter-thread synchronization mechanism called Reader-Initiated Memory Synchronization (RMS) eliminates the overhead of memory synchronization instructions in the common case. The protocol of one embodiment of the present invention is general, that is, not specific to any particular programming synchronization construct, and correct with respect to the acquire-release protocol.

In another embodiment, the present invention omits the forehanded memory synchronization at the "releaser-side" of the operation, and recovers this synchronization at an acquire operation only if necessary, that is, if release and acquire operations will execute on different processors.

We address this problem because the increasing gap between processor and memory speeds has made the relative cost of memory synchronization high, and it is likely to increase in forthcoming system and processor architectures.

According to another embodiment of the present invention, an information processing system implements the above method on a general purpose computer system. A computer readable medium encompassing the present invention is also described.

BRIEF DESCRIPTION OF THE DRAWINGS

FIG. 5 illustrates an acquire-release synchronization protocol in a Reader-Initiated Memory Synchronization (RMS) in one embodiment of the present invention.

FIG. 6 illustrates a variant where the reservation is done per computational activity, not per logical processor in one embodiment of the present invention.

DETAILED DESCRIPTION OF THE INVENTION

Figure 1:
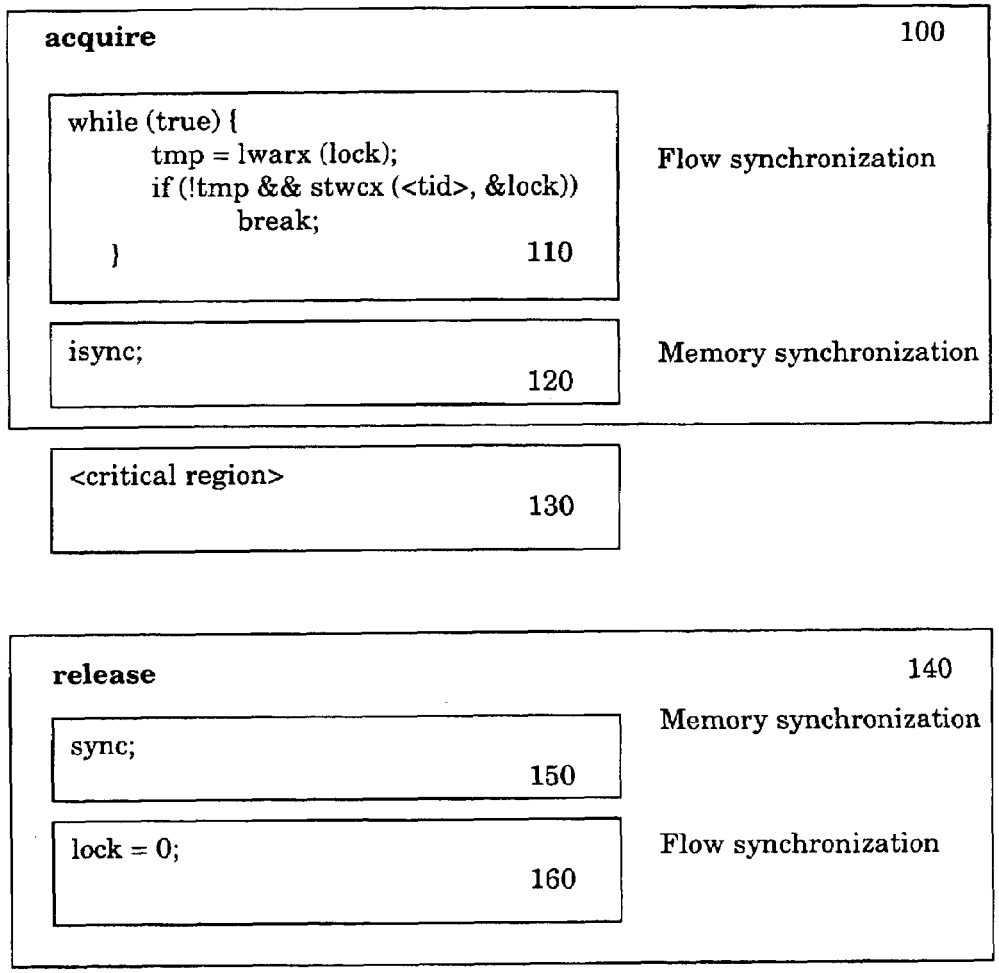
FIG. 1 illustrates an acquire-release synchronization protocol with proactive memory of synchronization.
Figure 2:
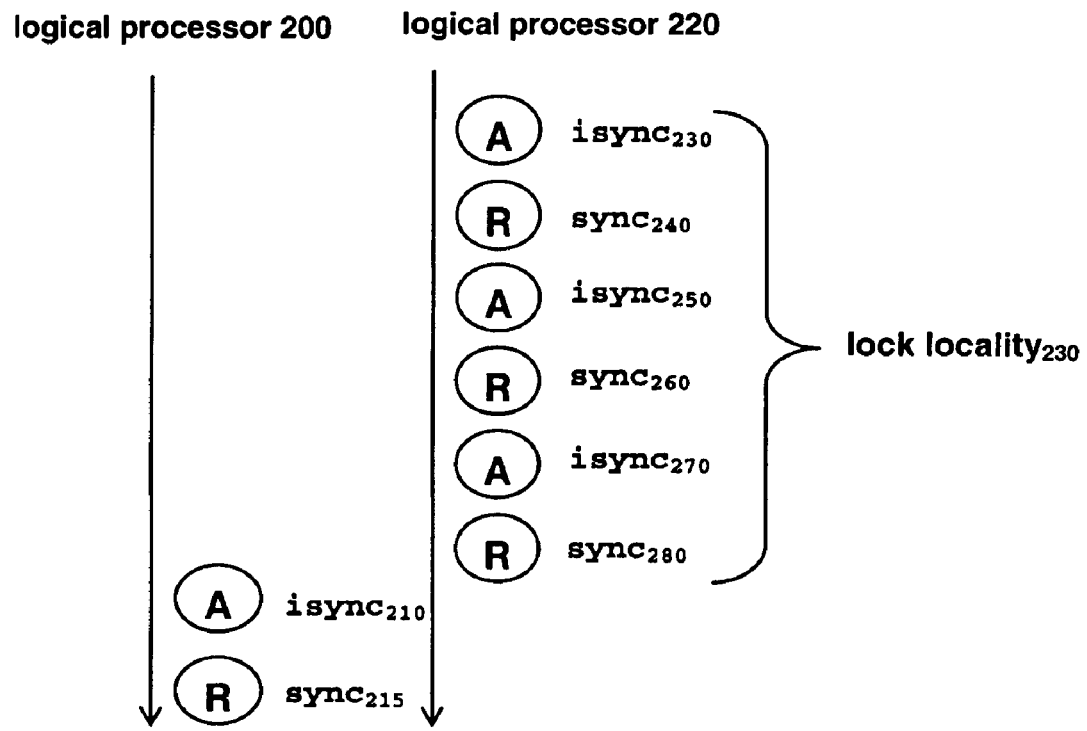
FIG. 2 illustrates the phenomenon of lock locality.

Embodiments of the present invention provide a method, computer readable medium and information processing system for streamlining synchronization protocols in execution of multi-threaded server applications. We discuss numerous specific details set forth by way of exemplary embodiments. It will be apparent to one skilled in the art, that the present invention may be practiced without these specific details. In other instances, well-known features have not been described in detail so as not to obscure the invention. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

The architecture of an information processing system of the present invention may include some or all of the following provisions. This description is provided for illustration alone. While the following description contains numerous specific details, such as annotation examples, demonstrative representations of graphs, example programming code, and architectural elements or algorithms details, these details are described only to provide a more thorough description of the present invention. The invention is not intended to be limited to these specific details.

The principles of the Reader Initiated Memory Synchronization of one or more embodiments of the present invention are described herein without reference to any specific computer architecture or implementation. The methods of the present invention are general and may be applied to components in any system that strives for a consistent view of shared storage; a component may be a single processor core, a tightly coupled multi-threaded processor core with shared caches (SMT), symmetric multi-processor with shared memory (SMP), or different cells in a non-uniform shared memory (NUMA) architecture.

In the methods of one or more embodiments of the present invention, this description refers to such a component as a logical processor. A logical processor is a construct that may execute one or several computational activities. Activities are not bound to a specific logical processor, as that term is used herein. A logical processor is self-consistent, which means that the computational activities that run on it do not have to employ explicit memory synchronization to observe a sequentially consistent view of memory. For computational activities to be performed correctly on different logical processors, memory consistency must be established explicitly.

For the illustration of one embodiment of the present invention, we assume that computational activities may synchronize through (mutex) locks. The lock shall provide the acquire-release memory semantics referred to previously.

The theory of one embodiment of the present invention is based on the following basic principles. First, a lock can be reserved for a logical processor, and there can be at most one such reservation per lock at a time. Second, computational activities at the reserving logical processor can acquire and release the lock without explicit memory synchronization. Third, at a reservation transfer, i.e., an activity acquiring a lock that is not reserved on its processor, the acquiring activity initiates memory synchronization at the previously reserving logical processor. This memory synchronization occurs at the remote processor and is initiated by the designated 'reader' of data—hence reader-initiated memory synchronization.

Figure 3:
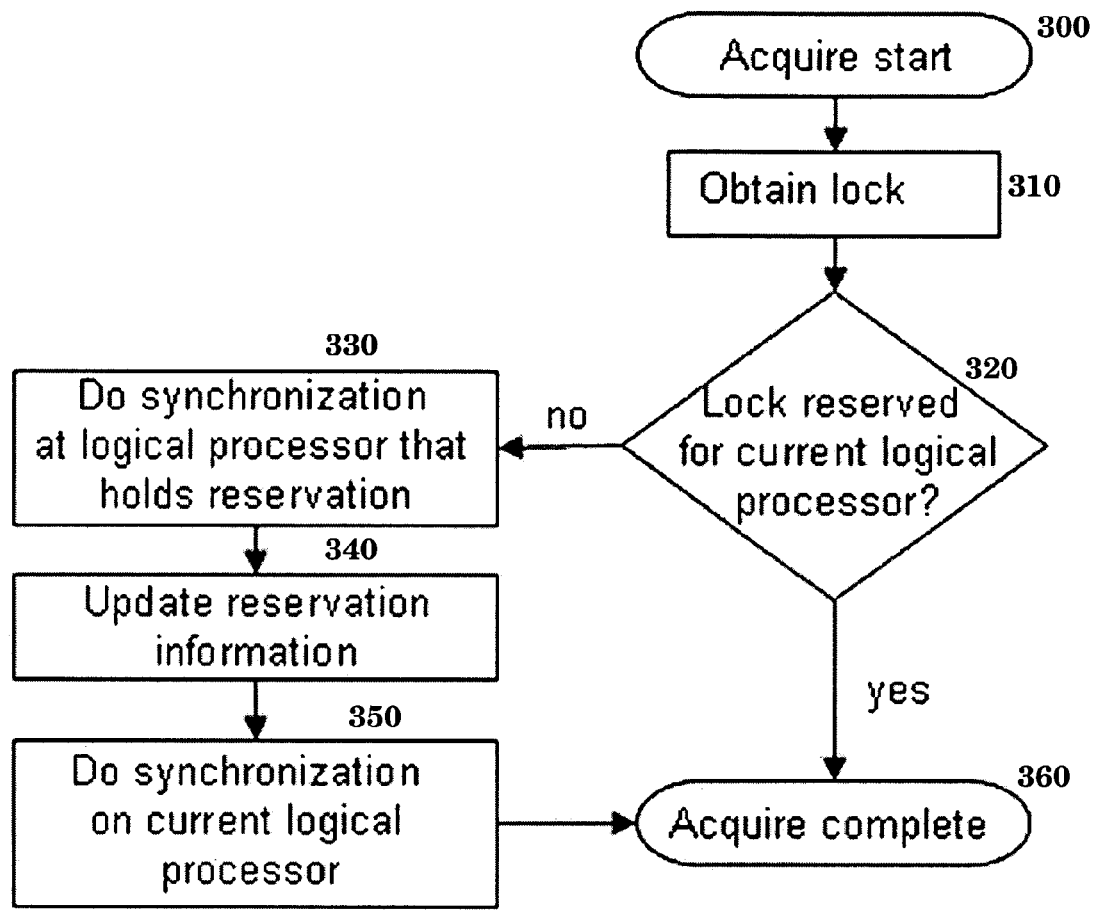
FIG. 3 is a flow chart for the acquire protocol in one embodiment of the present invention.
Figure 4:
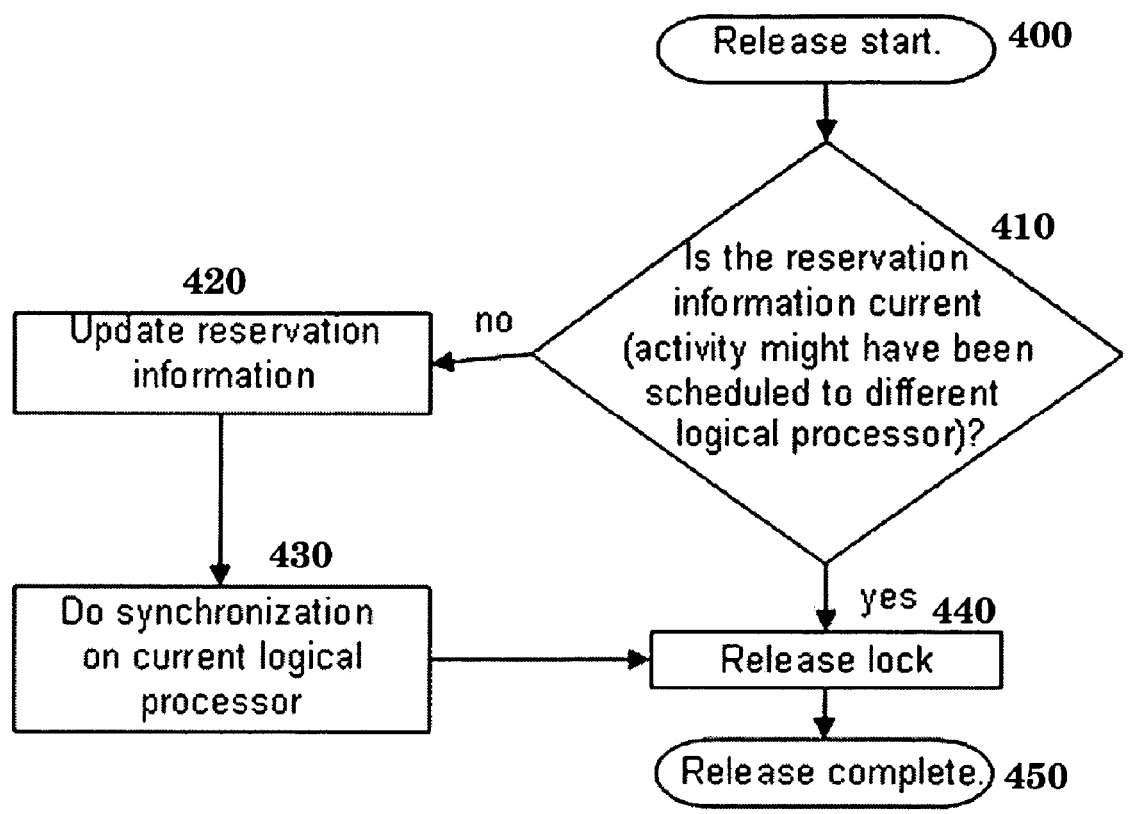
FIG. 4 is a flow chart for the release protocol in one embodiment of the present invention.

FIGS. 3 and 4 illustrate the extended acquire-release protocol. FIG. 5 illustrates an acquire-release protocol for a lock using one embodiment of the present invention. This code is a simplified example, and does not contain provisions for re-entrant acquire, backoff, and queued waiting as would be understood by one of ordinary skill in the art. Because the aspect of memory synchronization addressed by embodiments of the present invention are orthogonal to the aspects of re-entrance and contention resolution, an explanation of such here is unnecessary.

Conceptually, a lock with the semantics of one or more embodiments of the present invention may have at least two fields: The field flag is the actual lock, as in FIG. 1; the field res is an extension that holds the identification of the reserving logical processor; either a task identifier <tid> and/or processor identifier <pid>, or other similar identifier, may be used to refer to the computational activity and the current logical processor. One embodiment of the present invention may extend the synchronization protocol as follows and as shown in FIG. 5.

Referring to FIG. 3, the acquire process starts with step 300. If the lock is taken successfully (step 310), the computational activity determines whether it executed on a logical processor for which this lock has been reserved earlier (step 320). If so, then the acquire is complete (step 360). If not, memory synchronization is recovered as follows: the rsync operation issues a synchronization request to the previously reserving processor (step 330) and completes once this remote synchronization has performed (sync on remote processor); then the reservation information of the lock is updated (step 340); finally, isync discards the effects of speculative reads on the local processor (step 350) and acquire is complete (step 360).

Referring to FIG. 4, the release process begins with step 400. A test is made at step 410 to discover if the computational activity, identified by <tid> above, has been rescheduled to another logical processor since the preceding acquire (step 300). If so, the reservation information is updated (step 420) and memory synchronization is issued (step 430); the sync operation is necessary to prevent other processors from acquiring the lock and observing stale reservation information. Finally, the lock is released (step 440) and release is complete the operation (step 450).

During the execution of the acquire or release protocol, a computational activity might be re-scheduled to run on another logical processor. This does not affect the correctness of the protocol, assuming that a computational activity is self-consistent. The necessary memory synchronization occurs with the re-schedule and the operations typically are issued by the operating system.

IMPLEMENTATION EXAMPLES

A) Per-processor Reservation Information Example

FIG. 5 illustrates an example implementation of an embodiment of the present invention, where the reservation information comprise the logical processor identifier <pid>.

Unlike sync and isync, the rsync operation has no immediate implementation counterpart on current hardware platforms such as PowerPC™. The present invention envisions software support, hardware support, or a combination of both for the implementation of this invention. Similarly, the identifier of the current logical processor (<pid>) shall be made available to a computational activity through a software or hardware mechanism.

Referring again to FIG. 5, first, the acquire function 500 comprises flow synchronization and memory synchronization steps. In flow synchronization step 510, the lwarx, and stwcx instructions of acquire function 500 may be executed in a loop to achieve an atomic 'load and store' of the lock variable. Once a thread succeeds to atomically read a lock value of zero (0) and to store its thread ID <tid> into the lock, it wins the race for the lock. In step 520, the memory synchronization of the acquire protocol, described in detail above in conjunction with FIG. 3, is executed. The isync instruction of step 520 ensures that preceding instructions complete, and discards instructions that follow it (in program order) that may have already started execution (due to pipelining or out-of order execution). Next, critical region 530 may be executed. When critical region 530 has completed the program may release its exclusive hold on the memory by performing release function 540.

When critical region 530 is complete, exclusive access to the memory may no longer be required, and can be released using release function 540. At release step 550, the memory synchronization of the release protocol, described in detail above in conjunction with FIG. 4, is executed. Then the sync instruction is performed. Finally, the lock is cleared at step 560.

B) Per-thread Reservation Information Example

Computational activities are self-consistent; hence in a specific embodiment of the present invention as described in this section, the identification of a computational activity <tid> may be used as reservation information. FIG. 6 illustrates the implementation of this special case.

Referring to FIG. 6, first, an acquire function 600 comprises a memory synchronization and flow synchronization, similar but distinct from that shown in FIG. 5. First, the lwarx and stwcx instructions of acquire step 610 may be executed in a loop to achieve an atomic 'load and store' of the lock variable. Once a thread succeeds to atomically read a lock value of zero (0) and to store its thread ID <tid> into the lock, it wins the race for the lock. The isync instruction of step 620 ensures that preceding instructions complete, and discards instructions that follow it (in program order) that may have already started execution (due to pipelining or out-of order execution). Next, critical region 630 may be executed. When critical region 630 has completed, the program may release its exclusive hold on the memory by performing release function 640.

When critical region 630 is complete, exclusive access to the memory may no longer be required, and can be released using release function 640. Here, instead of releasing the lock by setting it false, the function sets the process <tid> of the last holder of the lock into the lock itself.

According to this embodiment of the invention, there are several aspects that distinguish this implementation from other embodiments of the invention such as shown in FIG. 5: First, there is no need to update the reservation information in the release section because the identifier of a computational activity remains constant. Second, the conceptual variables flag and res may be encoded in a single word. This is convenient for the implementation of bi-modal locks: the flag may be signified by the lower bit(s) (in the example of FIG. 5, the lowermost bit) in the lockword, and the reservation information may be kept in the upper bits. At the release, the identifier of the computational activity <tid>, may simply be left in the lockword as reservation information. This embodiment assumes that the lower bits of this identifier are zero (0). Third, the implementation does not require that the identifier of the current logical processor is available. Fourth, the implementation of the rsync operation may be based on an efficient inter-thread communication mechanism that could be provided, for example, by the operating system or a software execution environment (virtual machine).

C) Combined Reservation Information Example

A combination solution also envisions one or more embodiments of the present invention. In a combined solution, reservation information may be a combination of the thread and processor identifier, such that a computational activity holds a reservation if it executes on the logical processor specified by the reservation information or if it is the reserving computational activity itself (or both). Otherwise, this embodiment would proceed as in the examples discussed above.

Therefore, while there has been described what is presently considered to be illustrative embodiments, it will be understood by those skilled in the art that other modifications can be made within the spirit of the invention.

It is believed that the reader-initiated share memory synchronization of the present invention, and many of its attendant advantages, will be understood from the foregoing description, and it will be apparent that various changes may be made in the form, construction and arrangement of the parts without departing from the sprit or scope of the invention or sacrificing all of the material advantages, the forms herein above described being merely preferred or exemplary embodiments thereof.

We claim:

1. A method of optimizing memory synchronization through software in a multi-threaded computer system using a reader-initiated memory synchronization process, the method comprising:

executing in a first processor at least one computational activity requesting an exclusive access to a shared memory; and using a multi-field lock associated with the shared memory to obtain the exclusive access to the shared memory, wherein obtaining the exclusive access comprises:

inspecting the multi-field lock to determine whether the multi-field lock is reserved for the first processor;

wherein said reservation indicates that a processor reserving the multi-field lock has priority in a race condition for future acquisition of the lock, and the reserving processor does not require performing memory synchronization on future acquisition of this lock;

and wherein when the multi-field lock is not reserved for exclusive use by the first processor, the first processor performs steps of:

when the multi-field lock is reserved by a second processor and the second processor did not previously perform the synchronization operation when it last released the lock:

synchronizing the shared memory by the second processor;

updating the multi-field lock reservation; and performing an instruction synchronization for the first processor.

2. The method of claim 1 wherein the first processor and the second processor are logical processors.

3. The method of claim 1 further comprising:

verifying whether the multi-field lock remains reserved for the first processor;

when the reservation is unverified: updating the multi-field lock reservation; performing a memory synchronization of the first processor; and releasing the multi-field lock reservation.

4. The method of claim 3 wherein the first processor and the second processor are logical processors.

5. A method of acquiring a lock, the method comprising:

obtaining a lock;

determining whether the lock is reserved for a current logical processor;

synchronizing at the current logical processor when the lock is reserved by another logical processor, and synchronizing at the logical processor that holds the reservation;

updating the reservation information; and synchronizing on the current logical processor.

6. A method for releasing a lock, the method comprising:

determining whether the reservation information is current;

releasing the lock when the reservation information is current; when the reservation information is not current, updating the reservation information and synchronizing on the current logical processor and when the reservation information is current, updating the reservation information without synchronization on the current logical processor.

7. A computer program product comprising a computer readable storage medium including executable code for:

executing in a first processor at least one computational activity requesting an exclusive access to a shared memory; and using a multi-field lock associated with the shared memory to obtain the exclusive access to the shared memory, wherein obtaining the exclusive access comprises:

inspecting the multi-field lock to determine whether the multi-field lock is reserved for the first processor;

wherein said reservation indicates that a processor reserving the lock has priority in a race condition for future acquisition of the lock, and the reserving processor does not require performing memory synchronization on future acquisition of this lock;

wherein when the multi-field lock is not reserved for exclusive use by the first processor: and when the multi-field lock is reserved by a second processor and the second processor did not previously perform the synchronization operation when it last released the lock, the first processor performs steps of:

synchronizing the shared memory by the second processor;

updating the multi-field lock reservation; and performing an instruction synchronization for the first processor.

8. The computer program product of claim 7 wherein a first processor in a multi-threaded computer system requests a memory synchronization operation to be performed on a second processor.

* * * * *